United States Patent
Degorce-Dumas et al.

(10) Patent No.: US 12,275,288 B2
(45) Date of Patent: Apr. 15, 2025

(54) MOTOR SUPPORT AND HEATING, VENTILATION AND/OR AIR-CONDITIONING DEVICE FOR A MOTOR VEHICLE

(71) Applicant: Valeo Systemes Thermiques, Le Mesnil Saint-Denis (FR)

(72) Inventors: Clara Degorce-Dumas, Le Mesnil Saint Denis (FR); Stéphane De Souza, Le Mesnil Saint Denis (FR); Clémence Kwaczewski, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 432 days.

(21) Appl. No.: 17/771,989

(22) PCT Filed: Oct. 13, 2020

(86) PCT No.: PCT/FR2020/051800
§ 371 (c)(1),
(2) Date: Apr. 26, 2022

(87) PCT Pub. No.: WO2021/084177
PCT Pub. Date: May 6, 2021

(65) Prior Publication Data
US 2022/0371399 A1 Nov. 24, 2022

(30) Foreign Application Priority Data
Oct. 29, 2019 (FR) ...................................... 1912161

(51) Int. Cl.
*H02K 5/24* (2006.01)
*B60H 1/00* (2006.01)
(Continued)

(52) U.S. Cl.
CPC ......... *B60H 1/00585* (2013.01); *F04D 25/06* (2013.01); *F04D 25/08* (2013.01);
(Continued)

(58) Field of Classification Search
CPC .. H02K 5/20; H02K 5/02; H02K 5/04; H02K 5/08; H02K 9/16; H02K 9/19; H02K 9/18;
(Continued)

(56) References Cited

U.S. PATENT DOCUMENTS

2017/0110932 A1\* 4/2017 Berkouk ................. F04D 25/08

FOREIGN PATENT DOCUMENTS

FR 3047124 A1 \* 7/2017 ............. F04D 25/08

OTHER PUBLICATIONS

FR 3047124 A1 Translation (Year: 2017).\*

\* cited by examiner

*Primary Examiner* — Bryan R Perez
(74) *Attorney, Agent, or Firm* — Osha Bergman Watanabe & Burton LLP (57) ABSTRACT

A motor support comprises two coaxial rings (20; 22) and an element for limiting the tilting of the inner ring relative to the outer ring. The limiting element comprises a finger (26) projecting from a first of the rings (20; 22) and housed in a receptacle (28) in the second of the rings (20; 22). An axial end-stop in the receptacle (28) limits the movement of the finger (26) in the receptacle (28) in the direction of the common axis (A) of the two rings (20; 22). The axial end-stop comprises a spigot (32) extending from a base (38) of a peg (36) through a wall (45) of the receptacle. The base (38) of the peg (36) is fixed to the second ring. The spigot (32) has a projection (44) capable of abutting against the wall (45) of the receptacle (28).

17 Claims, 7 Drawing Sheets

(51) Int. Cl.
*F04D 25/06* (2006.01)
*F04D 25/08* (2006.01)
*F04D 29/60* (2006.01)

(52) U.S. Cl.
CPC ............. *F04D 29/601* (2013.01); *H02K 5/24* (2013.01); *B60H 2001/006* (2013.01)

(58) Field of Classification Search
CPC ........... H02K 9/197; H02K 9/20; H02K 9/06; H02K 9/14
See application file for complete search history.

MOTOR SUPPORT AND HEATING, VENTILATION AND/OR AIR-CONDITIONING DEVICE FOR A MOTOR VEHICLE

TECHNICAL FIELD

The present invention relates to the field of heating, ventilation and/or air-conditioning devices for motor vehicles. The invention relates more particularly to an electric-motor support for such a device.

PRIOR ART

Motor vehicles are commonly equipped with a heating, ventilation and/or air-conditioning device able to generate an air flow. Such a device is also able to manage the temperature and distribution within the vehicle interior of the air flow created. Such a heating, ventilation and/or air-conditioning device comprises, inter alia, a fan comprising a fan impeller rotationally driven by an electric motor. The electric motor is notably an electronically switched electric motor controlled by a power supply module.

An electronically switched electric motor, or brushless direct current motor, comprises a rotor and stator assembly, each of these components bearing electromagnetic elements whose interaction generates the movement of the rotor in relation to the stator and, ultimately, the movement of the fan impeller.

The electric motor is assembled in the heating, ventilation and/or air-conditioning device via a motor support which comprises an inner ring configured to accept the stator of the electric motor, and an outer ring able to be fixed, directly or indirectly, to a structural element of the vehicle.

A decoupling element is interposed between the inner ring and the outer ring. This decoupling element is intended to limit, or even to prevent, the transmission of vibration and/or stress generated by the rotation of the electric motor, from the inner ring to the outer ring. This then limits the transmission, to the heating, ventilation and/or air-conditioning device, of vibrations that could be felt by the occupants of the vehicle.

The decoupling element allows relative movement of the inner ring with respect to the outer ring, in particular tilting and/or relative translation of the inner ring with respect to the outer ring.

To limit the possible tilting of the inner ring relative to the outer ring, the motor support may further comprise a plurality of projecting fingers which each project from a first of the two rings to be housed in a respective receptacle formed in the second of the two rings, and on the other hand means for reducing the movement of each projecting finger inside the associated receptacle.

In a known manner, the means for reducing the movement of the projecting fingers can consist of an axial end-stop in each receptacle, formed by a spigot extending from a base of a peg through a wall of the receptacle, when the peg is attached to the second of the two rings. Each peg is fixed to the second of the two rings, by head riveting the base of the peg, at two points remote from the spigot.

The tilting of the first ring relative to the second ring is thus limited because the fingers come into abutment against the associated spigot, in their respective receptacle.

However, it has proved that the repeated forces of a projecting finger on the spigot of a peg can cause peening of the peg and, ultimately, the detachment of the peg from the second ring, in particular when the fixing points for fixing the base to the second of the two rings are remote from the spigot, so that each force of a projecting finger on an end-stop formed by the spigot can cause the base to bend, which can ultimately weaken it.

The object of the present invention is to propose a motor support, in particular for a heating, ventilation and/or air-conditioning device of a motor vehicle, which is simple to produce and which makes it possible to reduce the risks of separation between the pegs for reducing the movement of the projecting fingers and the second ring, while retaining, preferably, a relatively easy assembly.

SUMMARY

To this end, the subject of the invention is an engine support, in particular for a motorized fan unit of a ventilation installation for a vehicle, comprising: two coaxial rings, including an inner ring capable of receiving one or more motor elements and an outer ring capable of being fixed to a housing forming a structural element,
a decoupling element between the two coaxial rings, and
an element for limiting the tilting of the inner ring relative to the outer ring, the limiting element comprising a finger which projects from a first of the two rings and is housed in a receptacle formed in the second of the two rings, at least one axial end-stop being formed in the receptacle to limit the movement of the finger in the receptacle in the direction of the common axis of the two rings, the at least one axial end-stop comprising a spigot extending from a base of a peg through a wall of the receptacle when the peg is attached to the second of the two rings, the base of the peg being fixed to the second ring, the spigot having at least one projection capable of abutting against the wall of the receptacle.

Thus, the projection absorbs part of the forces which would otherwise be received at the base of the peg, the base being the element of the peg which is fixed to the motor support. Consequently, the mechanical strength of the pegs arranged on the motor support is improved and the risks of detachment reduced.

In particular, the proposed solution makes it possible to limit the bending of the base of the peg in the event of forces of the finger on the end-stop formed by the spigot of the peg.

As a preference, the motor support comprises one or more of the following features, considered alone or in combination:
the projection is adapted to come into abutment on a first face of the wall of the receptacle, the base of the peg being in contact with a second face of the wall, opposite the first face of the wall of the receptacle;
the second ring has a hole suitable for the passage of the spigot through the wall of the receptacle, when the spigot is inserted into the hole with the at least one projection pivoted with respect to the position in which the at least one projection is capable of abutting against the wall of the receptacle;
the base of the peg comprises a first relief, projecting in the plane of the base of the peg, and the second ring comprises a second relief, projecting in the direction of the common axis of the two rings, so that the cooperation of the first and second reliefs limits the pivoting of the peg around a longitudinal axis of the spigot;
the at least one projection of the spigot has a planar surface intended to come into abutment against the wall of the receptacle, the planar surface preferably extending in a plane normal to the common axis of the two rings;

the at least one projection and the spigot of the peg are rigid, the base of the peg being flexible;

the spigot has two projections capable of abutting against the wall of the receptacle, the two projections preferably forming between them an angle greater than or equal to 90° and/or less than or equal to 180° around a longitudinal axis of the spigot;

the at least one projection of the spigot has:
a length measured in a radial direction with respect to a longitudinal axis of the spigot greater than or equal to 4.90 mm and/or less than or equal to 5.10 mm; and or
a width measured perpendicular to a radial direction with respect to a longitudinal axis of the spigot greater than or equal to 1.68 mm and/or less than or equal to 1.72 mm and/or
a thickness measured along a longitudinal axis of the spigot greater than or equal to 1.90 mm and/or less than or equal to 2 mm;

the at least one projection of the spigot has, in a plane passing through a longitudinal axis of the spigot, a substantially trapezoidal cross section;

the base of the peg is fixed to the second ring by rivet heading or riveting, preferably at two distinct points of the base, arranged on either side of a longitudinal axis of the spigot;

the motor support comprises a second axial end-stop in the receptacle, the axial end-stop formed by the spigot and the second axial end-stop being arranged on either side of the finger, the axial end-stop formed by the spigot and the second axial end-stop preferably facing one another;

the at least one axial end-stop extends in the direction of the common axis of the inner and outer rings;

the at least one axial end-stop extends in a direction substantially perpendicular to the direction of elongation of the finger;

the finger has an H-shaped cross section;

the decoupling element comprises a ring of elastomeric material, overmolded between the inner ring and the outer ring;

the motor support comprises at least one axial end-stop formed by a peg extending from an inner surface of a receiving cavity formed in a housing constituting an air deflector;

the motor support comprises a plurality of fingers uniformly angularly distributed around the common axis of the two rings, each finger being housed in a respective receptacle, comprising two end-stops associated with each finger;

the motor support comprises at least three fingers uniformly angularly distributed around the common axis of the two rings; and the motor support comprises as many pegs as fingers.

According to another aspect, there is described a fan device, in particular for a ventilation installation for a vehicle, comprising an electric motor, in particular a brushless electric motor, a fan impeller, rotationally driven by the electric motor, and a motor support as described hereinabove in all its combinations, the motor, in particular the stator of the motor, being fixed to the inner ring of the motor support.

There is also described a heating, ventilation and/or air-conditioning device for a motor vehicle, comprising an impeller wheel, a motor for rotating the impeller wheel, and a motor support as described hereinabove in all its combinations, the motor being fixed to the inner ring of the motor support.

BRIEF DESCRIPTION OF THE DRAWINGS

Further features, details and advantages will become more clearly apparent from reading the detailed description given below by way of illustration and with reference to the following figures.

DETAILED DESCRIPTION

Figure 1:
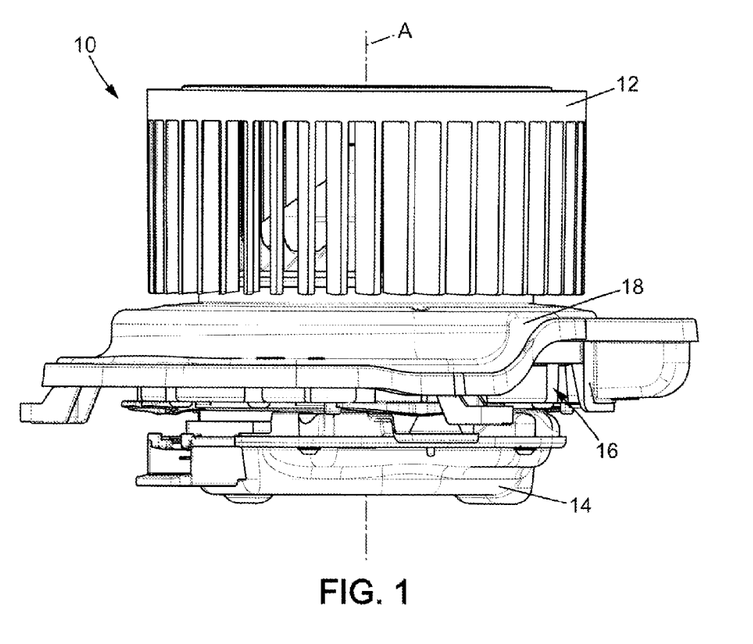
FIG. 1 is a schematic side view of one example of a fan device for a heating, ventilation and/or air-conditioning device for a motor vehicle.
Figure 2:
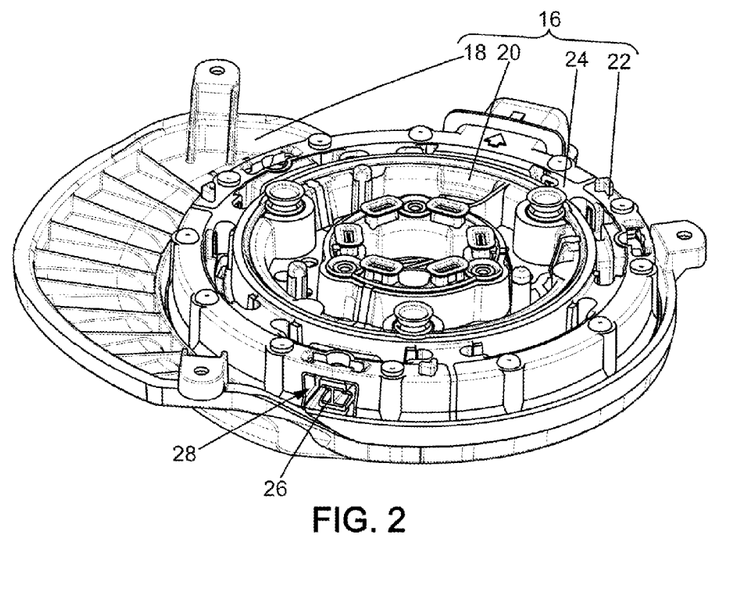
FIG. 2 is a schematic perspective view of an assembly formed by the motor support and a housing of the fan device of FIG. 1.
Figure 3:
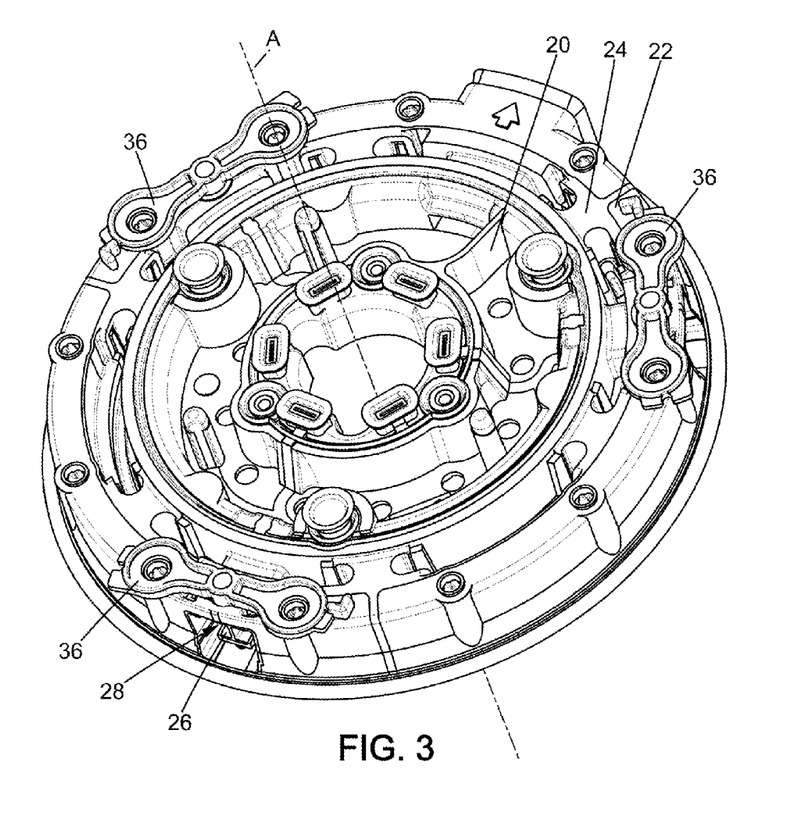
FIG. 3 is a schematic perspective view of a subassembly of the motor support of FIG. 2.

FIG. 1 schematically illustrates a side view of a fan device 10 for a heating, ventilation and/or air-conditioning device for a motor vehicle. In the conventional way, such a heating, ventilation and/or air-conditioning device for a motor vehicle comprises a ventilation circuit, a fan device 10 for causing the air to move in the ventilation circuit, and means for heating and/or means for cooling the flow of air set in motion by the fan device 10.

As illustrated in FIG. 1, the fan device 10 essentially comprises a fan impeller 12 and an electric motor, here hidden by a motor cowl 14, for driving the rotation of the fan impeller 12 about its axis A. The electric motor is, for example, a brushless motor. The fan device 10 further comprises a motor support 16 allowing the electric motor to be assembled on a support. In this particular instance, the electric motor is connected to a deflector 18 of the motor support 16, the deflector 18 forming part of the ventilation circuit of the heating, ventilation and/or air-conditioning device.

The motor support 16 is described in greater detail in what follows.

As visible in the figures, the motor support 16 essentially comprises an inner ring 20, an outer ring 22 and a decoupling element 24 interposed between the inner ring 20 and the outer ring 22. The decoupling element 24 is aimed at limiting the transmission of vibration from one of the two rings 20, 22 to the other of the two rings 20, 22. The decoupling element 24 is formed here by an elastomer ring. By way of example, the elastomeric material is SEBS (polystyrene-b-poly(ethylene-butylene)-b-polystyrene). The decoupling ring 24 is, for example, overmolded on the inner ring 20 and outer ring 22. The decoupling ring 24 thus secures together the inner ring 20 and outer ring 22. The inner ring 20, outer ring 22 and decoupling ring 24 are coaxial, having, as common axis, the axis of rotation A of the fan impeller 12.

The assembly formed by the inner ring 20, outer ring 22 and decoupling ring 24 is housed in a cavity of the deflector 18. The inner ring 20 is secured to the stator (not visible here) of the motor. The outer ring 22 is fixed here to the deflector 18. A layer of elastomeric material may be interposed between the outer ring 22 and the deflector 18.

According to the example depicted in the figures, the inner ring 20 has a plurality of fingers 26. The fingers 26 extend radially outward, from the exterior surface of the inner ring 20. In this particular instance, each finger 26 has an H-shaped cross section, comprising two substantially planar surfaces $26_1$, $26_2$ connected to one another by a web 263. Here, the planar surfaces $26_1$, $26_2$ are normal to the direction of the axis A common to the rings 20, 22, 24. Here, each planar surface $26_1$, $26_2$ is covered with a layer $27_1$, $27_2$ of elastomeric material.

In the example illustrated, the inner ring 20 has three fingers 26. The fingers 26 are preferably uniformly angularly distributed about the axis A of the inner ring 20.

The outer ring 22 for its part comprises a plurality of receptacles 28. Each receptacle 28 is designed to accept a respective finger 26. The receptacles 28 thus open at least onto the radially internal surface of the outer ring 22. In this particular instance, the receptacles 28 pass all the way through, opening onto the radially internal surface of the outer ring 22 and onto the radially external surface of the outer ring 22. The receptacles 28 are preferably uniformly angularly distributed about the axis A of the outer ring 22.

The housing of the fingers 26 in the receptacles 28 makes it possible to limit the capacity for relative tilting of the inner ring 20 with respect to the outer ring 22. What is meant here by tilting is any movement of one of the rings 20, 22 with respect to the other 20, 22 outside of the common midplane of the rings 20, 22, normal to the direction of the axis A common to the two rings 20, 22.

In the example illustrated, the receptacles 28 have dimensions such that there is clearance between the walls of each receptacle 28 and the finger 26 housed therein. In particular, there is clearance in the orthoradial direction. The walls of each receptacle 28 are covered here with elastomeric material. As a preference, the layer of elastomer 30 that covers the walls of each receptacle 28 is formed as one with the decoupling ring 24.

Figure 4:
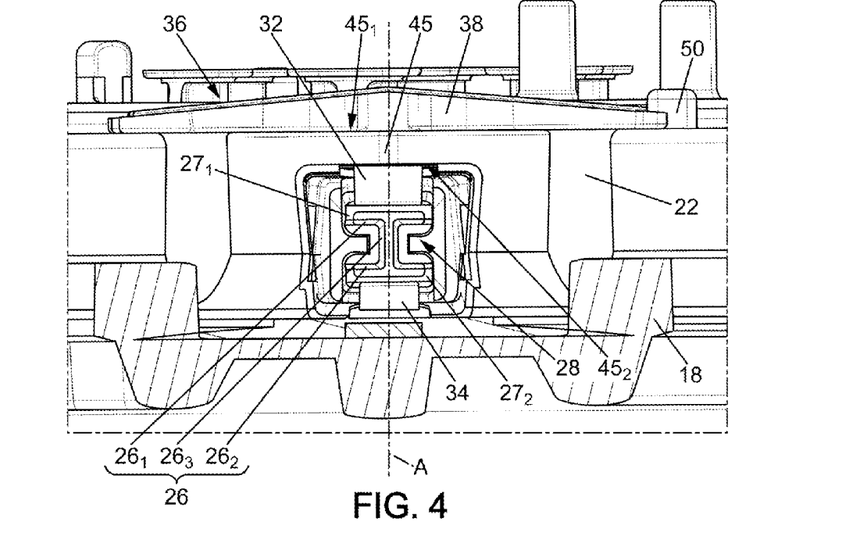
FIG. 4 is a schematic side view of a detail of the subassembly of FIG. 3.

As is more particularly visible in FIG. 4, in each receptacle 28, the finger 26 collaborates with two axial end-stops 32, 34 to further limit the axial movement of the finger 26 in the receptacle 28. Here, the two axial end-stops 32, 34 project from the walls of the receptacle 28. What is meant here by an axial end-stop is a stop that limits movement in the direction of the common axis A of the rings 20, 22, 24. The two axial end-stops 32, 34 are here facing each other. In other words, the two axial end-stops 32, 34 are substantially aligned in a direction parallel to the common axis A of the rings 20, 22, 24.

In the example illustrated, the elastomeric material of one of the layers $27_1$, $27_2$ is in contact between one of the axial end-stops 32, 34 and one of the planar surfaces $26_1$, $26_2$ of the finger 26. This limits the possible movement of the finger 26 in the receptacle 28, in the axial direction A. Consequently, the possible relative movements of the two rings 20, 22 are also limited.

The elastomeric material of the layers $27_1$, $27_2$ may advantageously be overmolded on the surfaces $26_1$, $26_2$ of the fingers 26, particularly at the same time as the overmolding of the decoupling ring 24. The elastomeric material is thus held in position with respect to the fingers 26. This then also makes the inner ring 20 easier to mount with respect to the outer ring 22.

Preferably, the thicknesses of the layers $27_1$, $27_2$ are advantageously equal. Thus, a centering of the fingers 26 between the two axial end-stops 32, 34 is possible.

The first axial end-stop is formed here by a spigot 32 of a peg 36. The peg 36 also comprises a substantially planar base 38 from which the spigot 32 extends along an axis B intended to be parallel to the common axis A of the rings 20, 22, 24 when the peg 36 is fixed on the outer ring 22. The base 38 here has two openings 40. The two openings 40 are arranged on the base 38, on either side of the longitudinal axis B of the spigot 32. The base 38 is fixed on the outer ring 22 at the level of the two openings 40. Preferably, the base 38 is fixed to the outer ring 22 by rivet heading or riveting, through the two openings 40.

The base 38 further comprises a relief 48, extending substantially in the plane of the base 38, at one end of the base 38.

Figure 8:
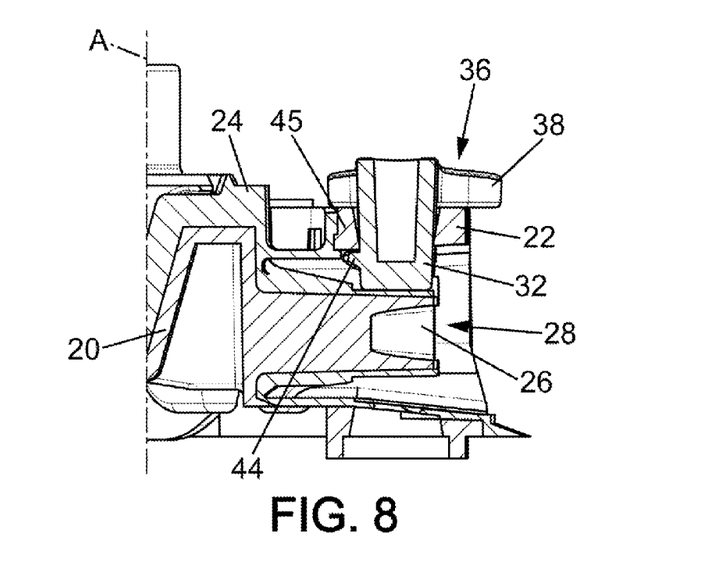
FIG. 8 is a cutaway view of the motor support of FIGS. 2 and 3 showing the arrangement of the peg of FIGS. 5 and 6 therein.

The spigot 32 is here substantially cylindrical, of circular cross section. The spigot 32 has a projection 44 extending radially from a lateral surface $32_1$ of the spigot 32. As illustrated in FIG. 8, once the peg 36 is mounted on the second ring 22, the projection 44 extends into the receptacle 28. Thus, the base 38 of the peg 36 and the projection 44 are separated, in the mounted position of the peg 36 on the second ring 22, by a wall 45 formed by the second ring 22. The wall 45 partially delimits the receptacle 28. The base 38 is in contact with a first face 451 of the wall, called the external face 451. The projection 44 is adapted to come into abutment against the wall 45 of the receptacle 28, on a face $45_2$ of the wall 45, called the internal face $45_2$, opposite to the external face 451.

Figure 5:
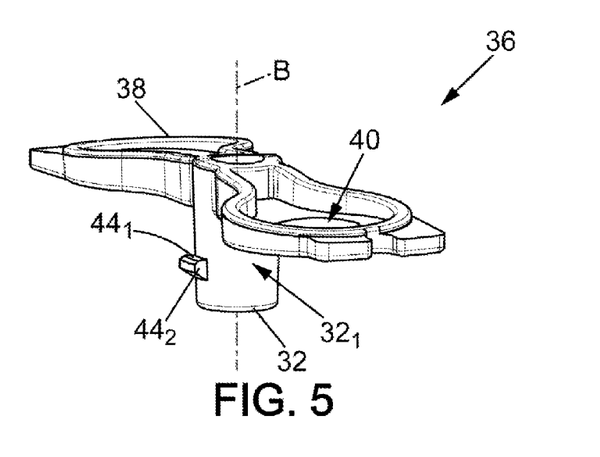
FIG. 5 is a schematic perspective view of a first example of a peg that can be employed in the motor support of FIGS. 2 and 3.
Figure 6:
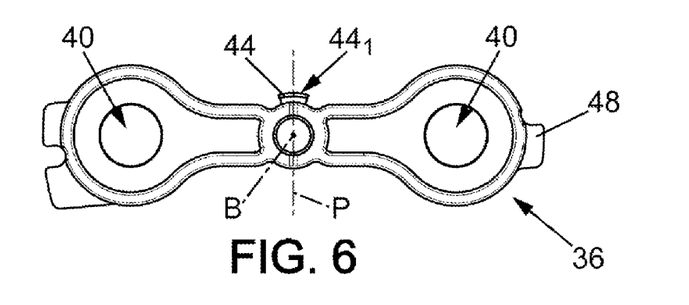
FIG. 6 is a schematic top view of the first example of the peg of FIG. 5.

In the example of FIGS. 5 and 6, the projection 44 of the spigot 32 has, in a plane P including the longitudinal axis B of the spigot 32, a cross section of substantially trapezoidal shape. The cross section of the projection 44 can be substantially constant in any plane passing through the longitudinal axis B of the spigot, crossing the projection 44. Thus, the lateral walls $44_2$ of the projection may have a substantially trapezoidal shape.

The projection 44 has for example a first planar surface $44_1$. The planar surface $44_1$ here extends in a plane normal to the longitudinal axis B of the spigot. Advantageously, the planar surface $44_1$ is thus parallel to the internal face $45_2$ of the wall 45. The projection 44 has a length, measured in a radial direction with respect to the longitudinal axis B of the spigot 32, greater than or equal to 4.90 mm and/or less than or equal to 5.10 mm. The length of the projection 44 is for example measured on the surface $44_1$. Furthermore, the projection 44 has a width measured perpendicular to the radial direction with respect to the longitudinal axis B of the spigot 32 greater than or equal to 1.68 mm and/or less than or equal to 1.72 mm. The width of the projection 44 can for example be measured on the planar surface $44_1$.

The planar surface $44_1$ is for example substantially annular.

The projection 44 may also have a thickness, measured parallel to the longitudinal axis B of the spigot 32, greater than or equal to 1.90 mm and/or less than or equal to 2 mm. The thickness of the projection 44 can for example be measured on a lateral surface $44_2$ of the projection 44, in particular at the base of the projection 44 where the projection 44 is connected to the spigot 32.

Figure 7:
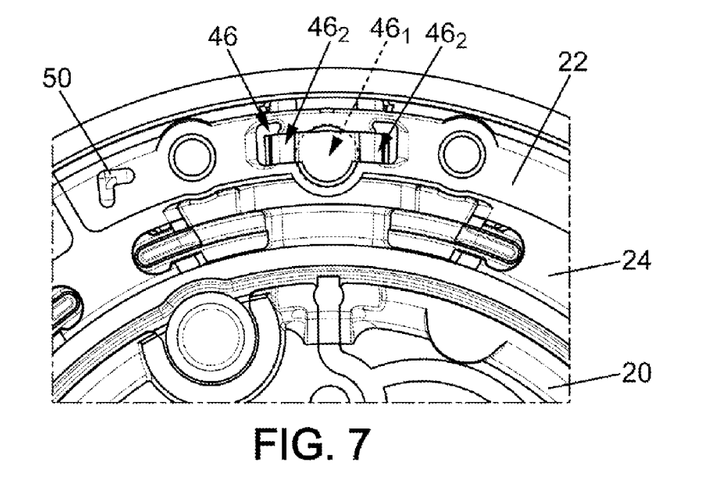
FIG. 7 is a schematic top view of a detail of the subassembly of FIG. 3.

As illustrated in FIG. 7, the outer ring 22 has a plurality of holes 46. Each hole 46 opens into an associated receptacle 28. Each hole 46 passes through a wall 45 of an associated receptacle 28. Each hole 46 here has a cross section, in a plane normal to the direction of the common axis A of the two rings 20, 22, having a substantially circular first portion $46_1$. The circular portion $46_1$ has a diameter equal to the diameter of the spigot 32. The cross section of each hole 46 also comprises a second elongated portion $46_2$, contiguous to the first portion $46_1$, extending in an orthoradial direction with respect to the common axis A. The second portion $46_2$ can extend, as illustrated in FIG. 7, on either side of the first portion $46_1$. The second portion $46_2$ has a width, measured in a radial direction with respect to the common axis A, less than the diameter of the first portion $46_1$.

The outer ring 22 further comprises a relief 50 in the vicinity of each hole 46. Each relief 50 projects in a direction parallel to the common axis A of the rings 20, 22. In this case, each relief 50 is substantially cylindrical, with an L-shaped cross section.

The spigot 32 is inserted into the wall 45 of the receptacle 28 through the hole 46. To allow the insertion of the spigot 32, the peg 36 is positioned, in particular is pivoted around the axis B of the spigot 32 with respect to the position received in the receptacle 28, such that the projection 44 extends substantially in an orthoradial direction of the outer ring 22. Thus, the cylindrical part of the spigot 32 passes through the circular portion $46_1$ of the hole 46 and the projection 44 passes through the elongated portion $46_2$ of the hole 46. Once the projection 44 has passed through the hole 46 and is received in the receptacle 28, the peg 36 is pivoted substantially around the longitudinal axis B of the spigot 32, until the projection 44 is placed facing the wall 45 of the receptacle. In other words, to allow the insertion of the spigot 32, the peg 36 is pivoted so that the projection 44 is in a pivoted position with respect to the position in which the projection 44 is able to abut against the wall 45 of the receptacle 28. In this case, the projection 44 can be pivoted through 90° relative to the position in which the projection 44 is capable of coming into abutment against the wall 45 of the receptacle 28, to allow the insertion of the spigot 32 into the hole 46.

Advantageously, the projection 44 is received in the receptacle 28 substantially when the base 38 of the peg 36 is in contact with the external face 451 of the wall 45. In other words, the distance, measured along the longitudinal axis B of the spigot 32, between the projection 44 and the base 38 is substantially equal to the thickness, measured in the direction of the common axis A, of the wall 45. Thus, after pivoting the peg 36 around the longitudinal axis B of the spigot 32 until reaching the position in which the projection 44 is able to abut against the wall 45 of the receptacle 28, the base 38 is in contact with the external surface 451 of the wall and the projection 44 is in contact with the internal surface $45_2$ of the wall 45.

Advantageously, the position in which the projection 44 is able to abut against the wall 45 of the receptacle 28 is reached, by rotation of the peg 36, the spigot 32 of which is received in the hole 46, when the relief 48 of the base 38 comes into contact with the relief 50 on the outer ring 22. The cooperation between the relief 48 of the base 38 and the relief 50 on the outer ring 22 therefore limits the pivoting of the peg 36 around the longitudinal axis B of the spigot 32, thus making it possible to place the projection 44 in the angular position in which it is able to abut against the wall 45 of the receptacle 28.

As illustrated in FIG. 8, in this position, the projection 44 extends in a direction substantially parallel to the direction of elongation of the finger 26.

Here, the projection 44 and the spigot 32 are rigid relative to the base 38, which is flexible. The projection 44 makes it possible to create an embedding between the peg 36 and the outer ring 22. Thus, the forces exerted by the finger 26 on the spigot 32, in the event of excessive tilting between the inner ring 20 and the outer ring 22, are distributed at the level of the projection 44, on the one hand, and at the level of the fixing points for fixing the base 38 to the second ring 22, on the other hand. A better distribution of these forces received thus makes it possible to limit the risks of detachment of the base 38, fixed to the outer ring 22.

Figure 9:
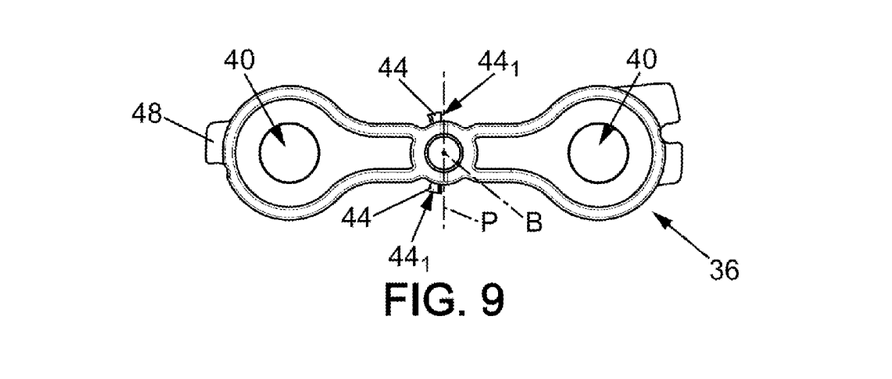
FIG. 9 is a schematic top view of a second example of a peg that can be employed in the motor support of FIGS. 2 and 3.

FIG. 9 illustrates a second example of a peg 36 that can be employed in the device 10 of FIG. 1.

According to this second example, the spigot 32 may have two projections 44. Each projection 44 is capable of abutting against the internal face $45_2$ of the wall 45 of the receptacle 28, opposite to the external face 451. As shown in FIG. 9, the two projections 44 here extend radially from the lateral surface of the spigot 32. The two projections 44 preferably form between them an angle greater than or equal to 90° and/or less than or equal to 180° around a longitudinal axis B of the spigot 32.

It should be noted here that the two projections 44 are here substantially of the same length and/or of the same thickness as the projection 44 of the first example. However, each projection 44 may have a width substantially equal to half the width of the projection 44 of the first example. Thus, the area of the two surfaces $44_1$ of the projections 44 of the second example, intended to come into abutment against the internal face $45_2$ of the wall 45 of the receptacle 28, is substantially equal to the area of the surface $44_1$ of the projection 44 of the first example.

Figure 10:
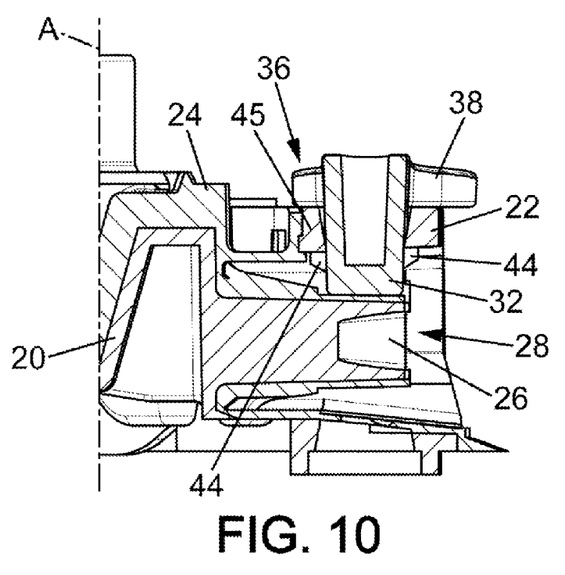
FIG. 10 is a cutaway view of the motor support of FIGS. 2 and 3 showing the arrangement of the peg of FIG. 9 in this support.

The presence of two angularly spaced projections $44_1$ makes it possible to distribute the pressure points on the internal face $45_2$ of the wall 45. For example, as illustrated in FIG. 10, a first planar surface $44_1$ of the projection 44 comes into abutment on the wall 45 at a point located radially inward relative to the spigot 32, and a second planar surface $44_1$ comes into abutment on the wall 45 at a point located radially outward with respect to the spigot 32. Here, by "a point radially inward with respect to the spigot 32", respectively "radially outward", is meant a point located closer to, respectively further from, the common axis A of the inner and outer rings 20, 22 than the spigot 32.

To facilitate the mounting of the peg 36, it is advantageous here that the elongated portion $46_2$ of the cross section of the hole 46 extends on either side of the circular portion $46_1$ allowing the cylindrical portion of the spigot 32 to pass through.

The present disclosure is not limited to the exemplary embodiments described with reference to the figures, but on the contrary is open to numerous variants accessible to those skilled in the art.

The invention claimed is:

1. A motor support for a motorized fan unit of a ventilation installation for a vehicle, comprising:
   two coaxial rings, including an inner ring capable of receiving one or more motor elements and an outer ring capable of being fixed to a housing forming a structural element;
   a decoupling element between the two coaxial rings; and
   an element for limiting the tilting of the inner ring relative to the outer ring, the limiting element comprising a finger which projects from a first of the two rings and is housed in a receptacle formed in a second of the two rings, at least one axial end-stop being formed in the receptacle to limit the movement of the finger in the receptacle in the direction of the common axis of the two rings, the at least one axial end-stop comprising a spigot extending from a base of a peg through a wall of the receptacle when the peg is attached to the second of the two rings, the base of the peg being fixed to the second ring, the spigot having at least one projection capable of abutting against the wall of the receptacle, wherein the base of the peg comprises a first relief, projecting in the plane of the base of the peg, and the second ring comprises a second relief, projecting in the direction of the common axis of the two rings, such that the cooperation of the first and second reliefs limits the pivoting of the peg around a longitudinal axis of the spigot.

2. The motor support as claimed in claim 1, in which the second ring has a hole for the passage of the spigot through the wall of the receptacle, when the spigot is inserted into the hole with the at least one projection pivoted relative to the position in which the at least one projection is able to abut against the wall of the receptacle.

3. The motor support as claimed in claim 1, in which the at least one projection of the spigot has a planar surface configured to come into abutment against the wall of the receptacle, the planar surface extending in a plane normal to the common axis of the two rings.

4. The motor support as claimed in claim 1, in which the spigot has two projections capable of abutting against the wall of the receptacle, the two projections forming between them an angle greater than or equal to 90° and/or less than or equal to 180° around a longitudinal axis of the spigot.

5. The motor support as claimed in claim 1, in which the at least one projection of the spigot has:
- a length measured in a radial direction with respect to a longitudinal axis of the spigot greater than or equal to 4.90 mm and/or less than or equal to 5.10 mm and/or
- a width measured perpendicular to a radial direction with respect to a longitudinal axis of the spigot greater than or equal to 1.68 mm and/or less than or equal to 1.72 mm and/or
- a thickness measured along a longitudinal axis of the spigot greater than or equal to 1.90 mm and/or less than or equal to 2 mm.

6. The motor support as claimed in claim 1, in which the at least one projection of the spigot has, in a plane passing through a longitudinal axis of the spigot, a substantially trapezoidal cross section.

7. The motor support as claimed in claim 1, in which the base of the peg is fixed to the second ring by rivet heading or riveting, at two distinct points of the base, arranged on either side of a longitudinal axis of the spigot.

8. A fan device for a ventilation installation for a vehicle, comprising:
- a brushless electric motor;
- a fan impeller, rotationally driven by the electric motor; and
- a motor support as claimed in claim 1, the stator of the motor being fixed to the inner ring of the motor support.

9. A heating, ventilation and/or air-conditioning device for a motor vehicle, comprising: a fan impeller, a motor for rotating the fan impeller, and a motor support as claimed in claim 1, the motor being fixed to the inner ring of the motor support.

10. A motor support for a motorized fan unit of a ventilation installation for a vehicle, comprising:
two coaxial rings, including an inner ring capable of receiving one or more motor elements and an outer ring capable of being fixed to a housing forming a structural element;
a decoupling element between the two coaxial rings; and
an element for limiting the tilting of the inner ring relative to the outer ring, the limiting element comprising a finger which projects from a first of the two rings and is housed in a receptacle formed in a second of the two rings, at least one axial end-stop being formed in the receptacle to limit the movement of the finger in the receptacle in the direction of the common axis of the two rings,
the at least one axial end-stop comprising a spigot extending from a base of a peg through a wall of the receptacle when the peg is attached to the second of the two rings, the base of the peg being fixed to the second ring, the spigot having at least one projection capable of abutting against the wall of the receptacle,
wherein the at least one projection of the spigot has a planar surface configured to come into abutment against the wall of the receptacle, the planar surface extending in a plane normal to the common axis of the two rings.

11. The motor support as claimed in claim 10, in which the second ring has a hole for the passage of the spigot through the wall of the receptacle, when the spigot is inserted into the hole with the at least one projection pivoted relative to the position in which the at least one projection is able to abut against the wall of the receptacle.

12. The motor support as claimed in claim 10, in which the base of the peg comprises a first relief, projecting in the plane of the base of the peg, and the second ring comprises a second relief, projecting in the direction of the common axis of the two rings, such that the cooperation of the first and second reliefs limits the pivoting of the peg around a longitudinal axis of the spigot.

13. The motor support as claimed in claim 10, in which the spigot has two projections capable of abutting against the wall of the receptacle, the two projections forming between them an angle greater than or equal to 90° and/or less than or equal to 180° around a longitudinal axis of the spigot.

14. The motor support as claimed in claim 10, in which the at least one projection of the spigot has:
- a length measured in a radial direction with respect to a longitudinal axis of the spigot greater than or equal to 4.90 mm and/or less than or equal to 5.10 mm and/or
- a width measured perpendicular to a radial direction with respect to a longitudinal axis of the spigot greater than or equal to 1.68 mm and/or less than or equal to 1.72 mm and/or
- a thickness measured along a longitudinal axis of the spigot greater than or equal to 1.90 mm and/or less than or equal to 2 mm.

15. The motor support as claimed in claim 10, in which the at least one projection of the spigot has, in a plane passing through a longitudinal axis of the spigot, a substantially trapezoidal cross section.

16. The motor support as claimed in claim 10, in which the base of the peg is fixed to the second ring by rivet heading or riveting, at two distinct points of the base, arranged on either side of a longitudinal axis of the spigot.

17. A fan device for a ventilation installation for a vehicle, comprising:
- a brushless electric motor;
- a fan impeller, rotationally driven by the electric motor; and
- a motor support as claimed in claim 10, the stator of the motor being fixed to the inner ring of the motor support.

\* \* \* \* \*